United States Patent
Javaid et al.

(10) Patent No.: US 9,119,015 B2
(45) Date of Patent: Aug. 25, 2015

(54) MOBILE DEVICE APPLICATION ANALYSIS

(71) Applicant: Vodafone IP Licensing Limited, Newbury, Berkshire (GB)

(72) Inventors: Usman Javaid, Newbury (GB); Nikolaos Lioulis, Newbury (GB); David Jeal, Newbury (GB)

(73) Assignee: Vodafone IP Licensing Limited, Newbury (GB)

( * ) Notice: Subject to any disclaimer, the term of this patent is extended or adjusted under 35 U.S.C. 154(b) by 0 days.

(21) Appl. No.: 14/082,410

(22) Filed: Nov. 18, 2013

(65) Prior Publication Data
US 2014/0141768 A1 May 22, 2014

(30) Foreign Application Priority Data
Nov. 16, 2012 (GB) .................................. 1220627.2

(51) Int. Cl.
*H04W 24/08* (2009.01)
*H04W 4/00* (2009.01)
*G06F 11/34* (2006.01)
*H04W 24/06* (2009.01)

(52) U.S. Cl.
CPC ............... *H04W 4/001* (2013.01); *G06F 11/34* (2013.01); *H04W 24/08* (2013.01); *H04W 24/06* (2013.01)

(58) Field of Classification Search
USPC ............... 455/423, 424, 425, 414.1, 418, 419
See application file for complete search history.

(56) References Cited

U.S. PATENT DOCUMENTS

| 2006/0222009 A1* | 10/2006 | Yao et al. ........................ 370/469 |
| 2008/0086773 A1 | 4/2008 | Tuvell et al. |
| 2010/0195503 A1* | 8/2010 | Raleigh ......................... 370/235 |
| 2010/0248707 A1* | 9/2010 | Hoffner et al. ................. 455/419 |
| 2011/0047597 A1* | 2/2011 | Mahaffey et al. ................. 726/3 |
| 2012/0278886 A1 | 11/2012 | Luna |
| 2013/0332996 A1* | 12/2013 | Fiala et al. ........................ 726/4 |
| 2014/0173051 A1* | 6/2014 | Sagayaraj et al. ............ 709/219 |

FOREIGN PATENT DOCUMENTS

WO  WO2010/141826 A2  12/2010

OTHER PUBLICATIONS

Janne Tervonen, "Deliverable DA2.2.22 Offloading Traffic from Cellular Networks with PBRM," TiViT, ICT SHOK Future Internet, Phase 2, Jun. 1, 2009-Dec. 31, 2010, Jun. 30, 2010.

* cited by examiner

*Primary Examiner* — Khai M Nguyen
(74) *Attorney, Agent, or Firm* — Knobbe, Martens, Olson & Bear LLP

(57) ABSTRACT

A mobile telecommunications device runs a plurality of applications installed on the device (for providing services to the device user). Monitoring means monitors the performance of the applications for generating performance data (for each application), and analyzing means analyzes the performance data (for each application) and to identify characteristics of the applications in dependence thereon. The mobile device may alert a user of the device of the problematic ones of the applications (for example via the GUI of the device). A mobile telecommunications device application performance analyzing apparatus may be coupled to the mobile telecommunications network that provides mobile telecommunications services to a plurality of mobile telecommunications devices and may receive the performance data and which includes analysis means for conducting analysis of the performance data to identify characteristics of the applications in dependence thereon.

30 Claims, 5 Drawing Sheets

MOBILE DEVICE APPLICATION ANALYSIS

TECHNICAL FIELD

The present invention relates to apparatus including a mobile telecommunications device having processor means operable to run a plurality of applications installed on the device (for providing services to the device user) and monitoring means operable to monitor the performance of the applications for generating performance data. The present invention also relates to a corresponding method.

BACKGROUND TO THE INVENTION

Surging data demand driven by the mobile devices mindset of consumers, the proliferation of smartphones and onset of the use of applications ("apps") on mobile devices is revolutionising the mobile industry. In 2010, smartphones accounted for more than 30 percent of total wireless handset sales. The uptake in smartphone usage is mostly driven by mobile apps, which, while using Internet in the background, offer a personalised experience to the user. A study from the Pew Internet Project illustrates that one in four US adults use mobile apps. App users had an average of 18 apps on their devices and a median of 10, the study estimates.

However, due to the open nature of apps ecosystem, any developer can upload an application to the source of applications (e.g. Android Market or Apple's App store) without any quality assurance checks. This results in a large number of malicious applications making their way to smartphones that attempt to take advantage of user's proclivity to ignore permissions and other warning signs and install whatever looks good to them. Some of the apps are truly dangerous, while others are simply not well written—e.g. not optimised so that they consume excessively device battery power and/or the user's data allowance (such as by sending unnecessary traffic to the network).

Current methods of rating applications are typically very simplistic. Typically, applications are rated according to how many times they have been downloaded. This is not particularly useful to a user, as applications that are downloaded frequently, may be deleted shortly thereafter if they are unsatisfactory.

Today, an important proportion of returned smartphones is the result of problems with apps and software, rather than hardware. Moreover, in a smartphone dominated marketplace, the performance of mobile apps is regarded as an important component of network operator selection and customer loyalty. It would be advantageous to offer a capability to users to make informed decisions while downloading applications, monitor real time apps performance, control their privacy and properly manage the apps on their smartphones. Moreover, with a better visibility of customer's smartphones apps performance, network operators could take predictive customer actions (e.g to offer customers upgraded services) through product and channel intervention.

Raw data collection gathering software is known in the form of an application which a user can download on their smartphone (or may be pre-installed) that interacts with other applications running on the smartphone in real-time (in the background) and monitors their performance in terms of battery consumption, CPU usage, data consumption, user privacy settings and app experience (data rate, latency). However, although such an application can collect data, it does not use/analyse the data to improve the user experience or network performance, and nor does it offer a solution for monetising the data.

It is in theory possible for the core of a mobile telecommunications network to analyse data sent to/from mobile terminal applications but it is difficult to identify to which application data relates, and impracticable to identify traffic relating to a particular application relating and to a particular mobile device user. Analysis at the network core, even if possible, does not provide representative data of application use as about 80% of data traffic from mobile terminals is currently transmitted over WLAN radio access networks rather that cellular networks.

SUMMARY OF THE INVENTION

In one aspect the present invention provides apparatus including a mobile telecommunications device having processor means operable to run a plurality of applications installed on the device (for providing services to the device user) and monitoring means operable to monitor the performance of the applications for generating performance data (for each application), the apparatus further including analysing means operable to analyse the performance data (for each application) and to identify characteristics of the applications in dependence thereon.

The performance data in the embodiment is such that the application and/or device to which it relates is identifiable. This facilitates analysis of performance data relating to a particular application and/or device.

The characteristics identified by the analysing means may indicate a problematic application. A problematic application may be one which consumes excessive resources. For example, a problematic application may be one that consumes excessive power, one that causes excessive data throughput at the device (data reception and/or transmission) or one that is accessing and transmitting personal information from the devices to the internet without prior user permissions.

The apparatus may include alerting means for alerting a user of the device to the problematic ones of the applications. For example a message may be given to the user via the GUI of the device which identifies the problematic ones of the applications. This may allow the user to take action to solve the problem. The alert may indicate what steps the user should take to solve the problem.

The analysing means may be operable to take action to mitigate the effect of a problematic application. For example, the analysing means might cause the application to be updated to an improved version which no longer causes the problems. The analysing means may limit the data throughput allowed for the particular problematic application.

The analysing means may be operable to stop a problematic application running. The analysing means may automatically uninstall a problematic application.

The analysing means may comprise part of the mobile telecommunications device. For example, the analysing means may be an analytics client hosted by the mobile telecommunications device. The analysing means may be contained within the housing of the mobile telecommunications device.

Alternatively, the analysing means may be coupleable to the mobile telecommunications device via a wireless link. The analysing means may be an analytics engine present in an analytics server which is coupled to the mobile telecommunications device via a mobile telecommunications network. The analysing means may be operable to receive performance data from a plurality of sources and to analyse the performance data to identify characteristics of applications associated with each of those sources. The analysing means may be operable to generate analytics data relating to different instances or versions of corresponding applications running on plurality of devices and/or associated with a plurality of sources. The analytics data may provide information about the same application being used on several different devices. The analytics data may also relate to different versions of the same application running on devices of different types—such as a map or messaging application which is used in a first version on a device with a Windows operating system and in a second version on a device using an Android operating system. The analytics data may provide information such as how, when and/or where an application is used. This information may be made available to developers of the application so that they can improve the application. This information may also be provided to a prospective user of an application, before installation of the application (e.g. through the application store), so that the prospective user can make an informed decision whether to install the application.

An analysing means may be provided as part of the mobile device and as an element separate from and coupleable to the mobile device via a wireless link.

The analysing means may be operable to cause communications destined for a data network (such as the Internet) to bypass at least a portion of a mobile or cellular telecommunications network and to use an alternative data route between the device and the data network. The analysing means may cause the communications to bypass the core of the mobile telecommunications network (such as the parts of the mobile telecommunications network excluding the base stations with which the mobile telecommunications device communicates—BTS in 2G, node B in 3G and eNodeB in 4G). Such communications may be transmitted from the base station to a direct link with the data network such as the Internet. This saves using resources of the core network to process the data.

The alternative data route between the device and the data network may bypass a mobile telecommunications network entirely. For example, an access point such as a WLAN access point may connect to the mobile telecommunications device wirelessly and route communications from the mobile telecommunications device to the Internet.

The analysis means may comprise an analytics server and the analysis means may be operable to send the performance data and/or analytics data from the mobile device to the analytics server via the core network when the alternative data route is in use for user data. Further, the analysis means may be operable to store the performance data at the mobile device while user data is being transmitted using the alternative data route and transmit the stored performance data to an analytics server when user data is transmitted via the core network.

In the embodiment analysing means has been provided in association with a mobile telecommunications network (in the form of an analytics engine). In the embodiment such an analytics engine may receive performance data from the monitoring means relating to the applications even when the mobile telecommunications device bypasses the mobile telecommunications network. This may be achieved by the monitoring means storing the performance data temporarily and then transmitting the performance data to the mobile telecommunications network when the mobile telecommunications network is no longer bypassed in its entirety. In this way the monitoring means may be operable to monitor the performance of the applications when communications are transmitted via the network and via the alternative data route.

Means may be provided for varying the quality of service (QoS) provided for communications relating to one or more of the applications. For example, a particular application of a particular user may be given preferential quality of service over other applications of that user. In this way the quality of the experience provided by the application may be maintained even when the network bandwidth available for that user is reduced.

The means for varying the quality of service may be operable to vary the quality of service based the performance data, analytics data and/or the analysis of the performance data.

According to another aspect of the present invention, there is provided a mobile telecommunications device including processor means operable to run a plurality of applications installed on the device (for providing services to the device user), monitoring means operable to monitor the performance of the applications for generating performance data (for each application), and analysing means operable to analyse the performance data (for each application) and to identify characteristics of the applications in dependence thereon.

According to a further aspect of the present invention, there is provided a mobile telecommunications device application performance analysing apparatus for coupling to a mobile telecommunications network that provides mobile telecommunications services to a plurality of mobile telecommunications devices, each of which mobile telecommunications devices is operable to run a plurality of applications and each of which mobile telecommunications devices includes monitoring means for monitoring performance of the applications for generating performance data, the analysing apparatus being operable to receive the performance data and which includes analysis means for conducting analysis of the performance data to identify characteristics of the applications.

The present invention also provides a method as defined in the claims.

There are two main features of the embodiment to be described, which build upon the known raw data collection:

1) Mobile application—a mobile device dashboard displays all the information collected by the raw data collection software in a GUI (Graphical User Interface) and analyses the data to prompt/warn customers of any malicious activity and/or poorly performing applications. The mobile application locally processes the data collected by raw data collection software to identify potentially problematic applications on the device (high resource use, high data usage, etc.), with the possibility of providing recommendations for solving these problems locally. The mobile application may also obtain information from an analytics server regarding the behaviour and performance of particular applications, and may present this to the user before installation of the application (e.g. through the application store interface), so the user can make an informed decision whether to install the application. This may be achieved by the monitoring means scanning a future application signature (the user wants to download) and by investigating with the analysis means about the expected performance of that application. It is to be noted that the analysis means may builds a global view of different applications interacting with the monitoring means on a large number and range of mobile devices. Hence a pre-download verification may be performed by the monitoring means and prompts the user accordingly to proceed with download.

2) Analytics server—the mobile device application dashboard may share this analysis with a central server in the network while working in the background (without customer notice/intervention) to generate a wider pool of analytical data to understand a customer's application portfolio, apps experience and data consumption preferences.

The network based analytics server may collate the data from multiple devices and process the data for the purposes of:
- identifying problematic applications (in terms for privacy or resource usage).
- providing qualitative recommendations for most used, better performing, least resource hungry applications (automated quality assurance of applications).
- providing qualitative feedback to application developers, including usage patterns, user location.
- Combining the data with $3^{rd}$ party data for enhanced analytics, targeted advertising etc.
- identifying usage patterns of applications for prioritising network traffic (e.g. most used apps get best data rate), and selective offloading of network traffic (e.g. data from least frequently used apps get offloaded to other bearers, such as offload from 2G, 3G or LTE to WLAN)

The mobile application dashboard may be an application which a customer can download on their smartphone (or may be pre-installed) that interacts with other applications running on the smartphone in real-time (in the background) and monitors their performance in terms of battery consumption, CPU usage, data consumption, user privacy settings and app experience (e.g., data rate, latency). The dashboard may display all this information in a GUI and prompt/warn customers of any malicious activity and/or poorly performing applications. In addition, the dashboard may share this analysis with the central analytics server in the network while working in the background (without customer notice/intervention) to generate a wider pool of analytical data to understand customer's application portfolio, apps experience and data consumption preferences.

BRIEF DESCRIPTION OF THE DRAWINGS

For a better understanding of the present invention an embodiment will now be described by way of example, with reference to the accompanying drawings, in which.

DETAILED DESCRIPTION OF EMBODIMENT OF THE INVENTION

Key elements of a 3G mobile telecommunications network, and its operation, will now briefly be described with reference to FIG. 1.

Each base station (e.g. Node B 1 and Femto 2) corresponds to a respective cell of the cellular or mobile telecommunications network 12 and receives calls from and transmits calls to a mobile terminal 10 in that cell by wireless radio communication in one or both of the circuit switched or packet switched domains. The mobile terminal 10 may be any portable telecommunications device, including a handheld mobile telephone, a personal digital assistant (PDA) or a laptop computer equipped with a network access datacard.

The nodeB 1 or Femto 2 can be considered to comprise two main parts: a radio frequency part (radio unit) and a baseband part. The radio frequency part handles the transmission of radio frequency signals between the antenna of the nodeB 1 or Femto 2 and the mobile terminal, and for converting radio frequency signals into digital baseband signals (and vice versa). The baseband part is responsible for controlling and managing the transmission of the baseband signals to other components of the mobile telecommunications network.

In a macro 3G network, the Radio Access Network (RAN) comprises Node Bs and Radio Network Controllers (RNCs). The Node B is the function within the 3G network that provides the physical and transport radio link between the mobile terminal (User Equipment, UE) and the network. The Node B performs the transmission and reception of data wirelessly across the radio interface, and also applies the codes that are necessary to describe channels in a CDMA system. The RNC is responsible for control of the Node Bs that are connected to it. The RNC performs Radio Resource Management (RRM), some of the mobility management functions and is the point where encryption is done before user data is sent to and from a mobile terminal. The RNC connects to the Circuit Switched Core Network through a Media Gateway (MGW) and to an SGSN (Serving GPRS Support Node) 5 in the Packet Switched Core Network. In FIG. 1, Node B 1 is controlled by RNC 3 across the Iub interface. An RNC may control more than one node B.

Figure 1:
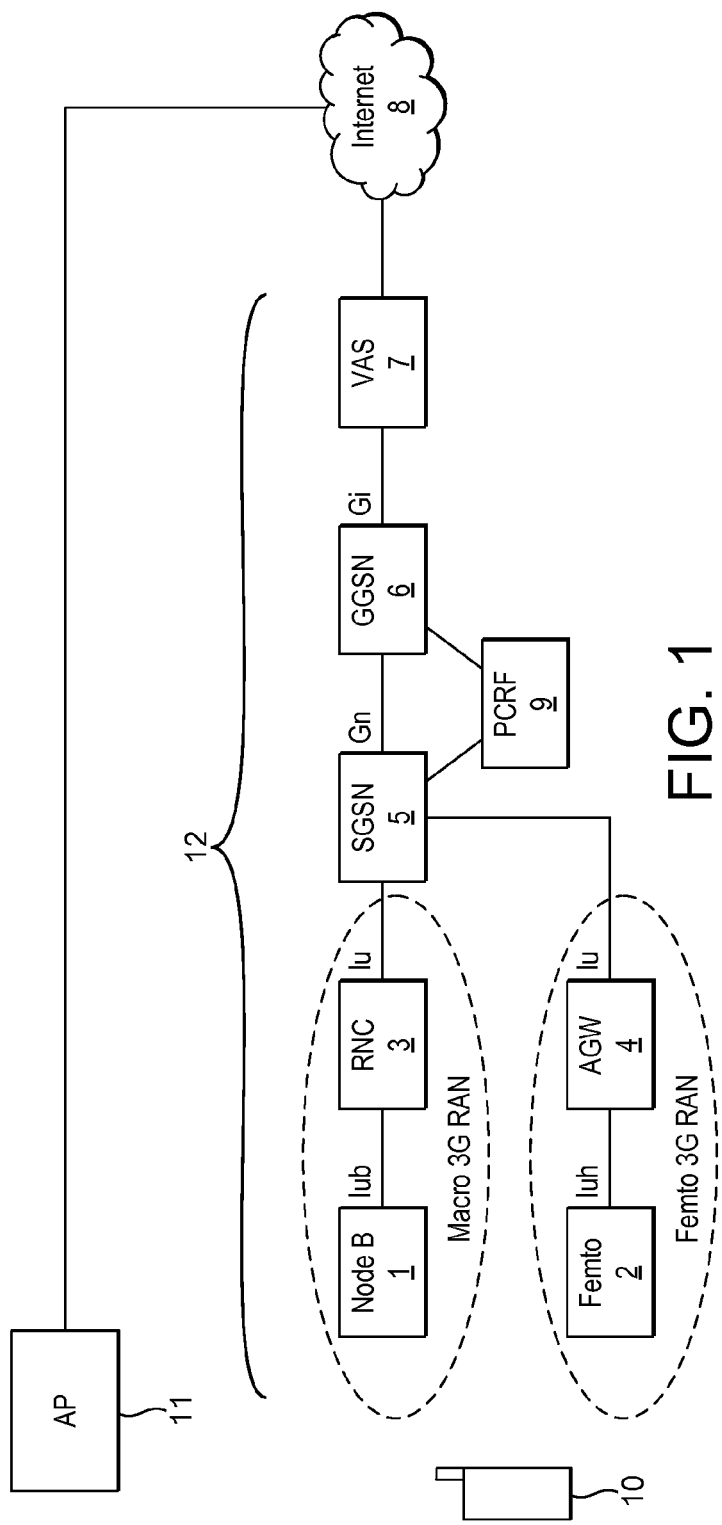
FIG. 1 illustrates a high level packet data network architecture, useful for explaining the prior art and embodiments of the present invention.

FIG. 1 also illustrates a Femto 3G RAN, with Femto 2 operating as the base station. Femto 2 is connected to an Access Gateway (AGW) (a.k.a Concentrator) 4 via an Iuh interface. Femto is an abbreviation of "femto-cells", and many other different names have been used to refer to the same apparatus.

The radio link between the Femto 2 and the mobile terminal uses the same cellular telecommunication transport protocols as Node B 1 but with a smaller range—for example 25 m. The Femto 2 appears to the mobile terminal 10 as a conventional base station, so no modification to the mobile terminal is required for it to operate with the Femto 2. The Femto 2 performs a role corresponding to that of Node B 1 in the macro 3G RAN.

The Femto 2 may be configured to serve a Wireless Local Area Network (WLAN) located in a home or office, in addition to GSM/UMTS/LTE networks. The WLAN could belong to the subscriber of the mobile terminal, or be an independently operated WLAN. The owner of Femto 2 can prescribe whether it is open or closed, whereby an open AP is able to carry communications from any mobile device in the GSM/UMTS/LTE network, and a closed AP is only able to carry communications from specific pre-assigned mobile devices.

Conventionally, in a 3G network (macro or Femto), the RANs are controlled by a mobile switching centre (MSC) and an SGSN (Serving GPRS Support Node) 5 of the core network. The MSC supports communications in the circuit switched domain, whilst the SGSN 5 supports communications in the packet switched domain—such as GPRS data transmissions. The SGSN 5 is responsible for the delivery of data packets from and to the mobile terminals within its geographical service area. It performs packet routing and transfer, mobility management (attach/detach and location management), logical link management, and authentication and charging functions. A location register of the SGSN 5 stores location information (e.g., current cell, current VLR) and user profiles (e.g., IMSI, address(es) used in the packet data network) of all mobile terminals registered with this SGSN. In FIG. 1, since the embodiment is concerned with data transmission, only the SGSN 5 is illustrated as being in communication with RNC 3 and AGW 4, across the Iu interface. The RNC 3 typically has a dedicated (not shared) connection to its SGSN 5, such as a cable connection.

Communications between the AGW 4 and the SGSN 5 are preferably IP based communications, and may be, for example, transmitted over a broadband IP network. Further, the connection between the Femto and the AGW 4 may use the PSTN (Public Switched Telephone Network). Typically a DSL cable connects the AGW 4 to the PSTN, and data is transmitted there-between by IP transport/DSL transport. The Femto 2 or AGW 4 converts the cellular telecommunications transport protocols used between the mobile terminal 10 and the Femto 2 to the appropriate IP based signalling.

The femto 2 may be connected to the AGW 4 by means other than a DSL cable and the PSTN network. For example, the femto 2 may be connected to the AGW 4 by a dedicated cable connection that is independent of the PSTN, or by a satellite connection.

The SGSN 5 is in communication with the GGSN 6 (Gateway GPRS Support Node) across the Gn interface. The GGSN is responsible for the interworking between the GPRS network and external packet switched networks, e.g. the Internet. The GGSN enables the mobility of mobile terminals in the networks. It maintains routing necessary to tunnel the Protocol Data Units (PDUs) to the SGSN 5 that service a particular mobile terminal. The GGSN 6 converts the GPRS packets coming from the SGSN 5 into the appropriate packet data protocol (PDP) format (e.g., IP or X.25) and sends them out on the corresponding packet data network. In the other direction, PDP addresses of incoming data packets are converted to the mobile network address of the destination user. The readdressed packets are sent to the responsible SGSN 5. For this purpose, the GGSN 6 stores the current SGSN 5 address of the user and their profile in its location register. The GGSN 6 is responsible for IP address assignment and is the default router for the connected mobile terminal. The GGSN 6 also performs authentication and charging functions. Other functions include IP Pool management and address mapping, QoS and PDP context enforcement.

In turn the GGSN 6 may route data via any applicable Value Added Service (VAS) equipment 7, before data is forwarded towards its intended destination via the Internet 8. As an example of the functionality of the VAS equipment, the traffic may be inspected for adult content before reaching the end-user if this user is under 18 years of age.

For billing purposes in particular, a PCRF (Policy and Charging Rules Function) apparatus 9 is also provided, in communication with both the SGSN 5 and the GGSN 6.

The SGSN 5, GGSN 6, VAS 7 and PCRF apparatus 9 comprise the core network of the mobile telecommunications network 12.

Additionally a WLAN access point (AP) 11 may be provided to enable the mobile terminal 10 (with WLAN communication capability) to access the internet 8 independently of the mobile telecommunications network 12 (including the core thereof). The WLAN communications may be in accordance with a relevant Standard, such as IEEE 802.11.

Traffic in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted.

It is possible to reduce packet data handling costs of a mobile telecommunications network by means of an alternative network cost model architecture, which breaks out of the traditional network architecture and nodes and utilises lower cost transport networks to optimise the data flow.

Figure 2:
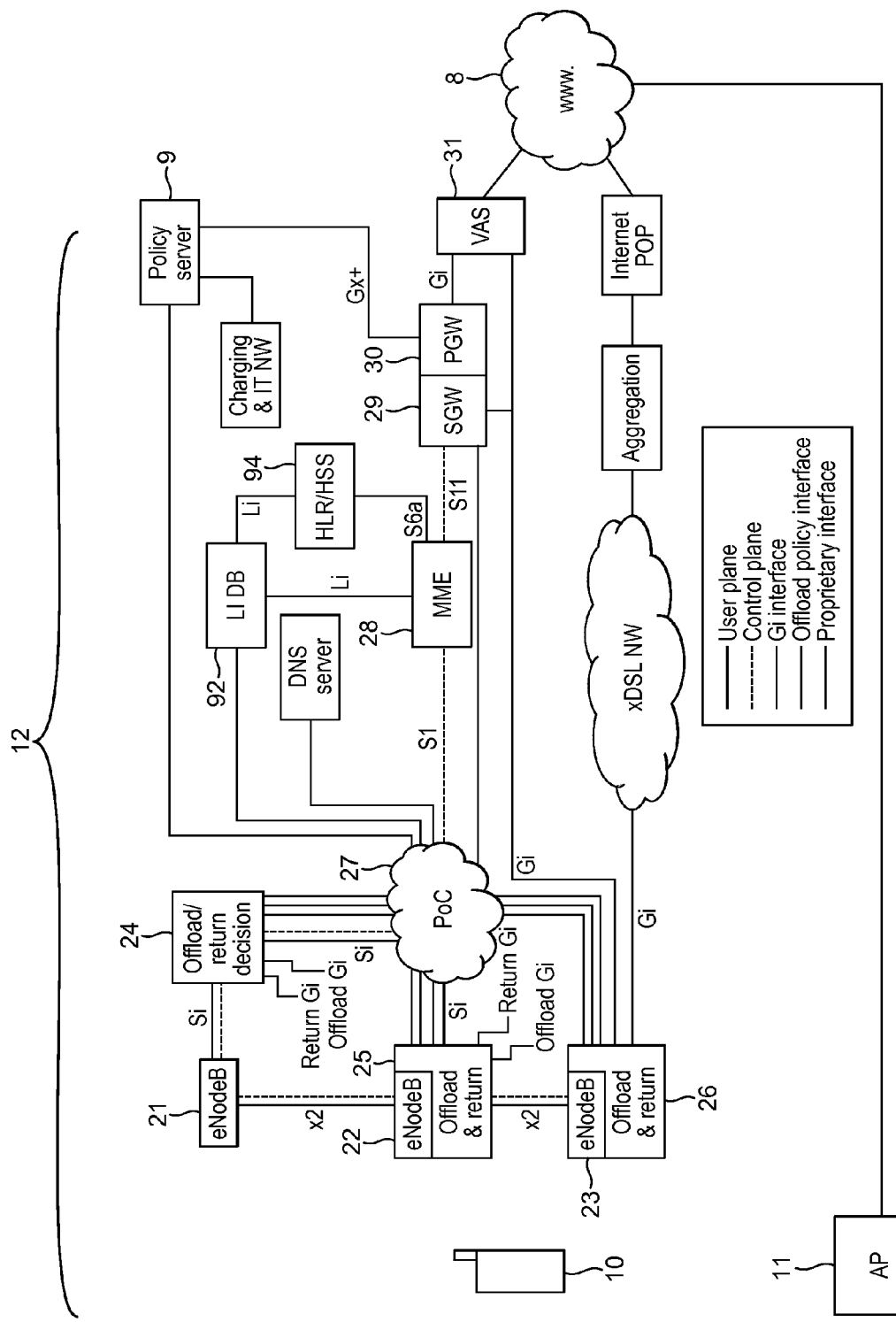
FIG. 2 illustrates a packet data network architecture implemented in an LTE/SAE network.

In this regard, FIG. 2 shows a high level description of the architecture that may be adopted to reduce packet data handling costs on the LTE/SAE macro network.

The LTE/SAE network 12 includes eNode Bs 21,22,23 which make up the RAN. The eNode Bs effectively combine the functionality of the node B and the RNC of the 3G network. These eNodeBs are the network components which communicate with the mobile communication devices (e.g. 10). The eNodeBs are arranged in groups and each group controlled by a Mobility Management Entity (MME) 28 and a User Plane Entity (UPE), not shown.

The MME 28 performs many of the mobility functions traditionally provided by the 3G SGSN. The MME 28 terminates the control plane with the mobile device 10. It is responsible for terminating NAS (Non Access Stratum) Signalling such as MM (Mobility Management) and SM (Session Management) information as well as coordinating Idle Mode procedures. Other responsibilities of the MME include gateway selection inter MME 28 Mobility and authentication of the mobile device.

The UPE manages protocols on the user plane such as, storing mobile terminal contexts, terminating the Idle Mode on the user plane, and PDP context encryption.

Offload/return decision functionality 24, 25, 26 is integrated into the network. Ideally this decision functionality is incorporated in the radio architecture. In this regard, the off-load/return decision blocks may be incorporated into the eNodeBs 25,26 or exist as separate physical entities 24. It is these offload/return decision blocks that determine the path of communications originating from the mobile terminals.

Each of the eNodeBs 21,22, 23 is connected to the mobile network core through a Point of Concentration (PoC) 27. All traffic from the eNodeBs 21, 22, 23 which is to be routed through the core mobile network is routed to the PoC 27. This includes both user plane and control plane data. On the control plane level, the PoC 27 routes data to and from the Mobility Management Entity (MME) 28 across the S1 interface. Control data is also sent to and from other core network components, including the Lawful Interceptor Database (LI DB) 92, DNS Server, Policy Server (including Charging rules and IT Network) 9 and Home Location Register/Home Subscriber Server (HLR/HSS) 94 (which contains subscriber and device profile and state information).

User plane data, on the other hand, is transmitted by the PoC 27 to the Serving GateWay (SGW) 29 and then to the Packet data network GateWay (PGW) 30. The SGW and PGW are typically separate entities, with the SGW being a data plane element whose primary function is to manage user-plane mobility and data being transferred between the eNodeBs and the PDN Gateway (PGW). From the PGW, data is routed across a VAS node 31 to the Internet 8. In LTE/SAE this is the standard data path from the mobile terminals to the Internet.

An alternative path on which to offload certain data to the internet is provided, whereby, each eNodeB 22, 23 may be connected to a DSL line which is directly connected to the internet 8. These xDSL connections may be made directly to the eNodeB or made to the eNodeB via other components, such as the PoC 27. In FIG. 2, the xDSL Network provides access directly to the public internet 8 from eNodeB 23 and is an alternative route for traffic from the PoC. The alternative path for data may be a third party network or may be a network owned or controlled by the owner of the mobile telecommunications network. By using such an alternative path, radio capacity, backhaul transport resource, core transport resource, cellular core network resources can be saved as well as improving performance and enhancing revenue for the mobile network operator.

As each eNode B and/or PoC is associated with an Offload/Return block 24,25,26, for each data packet request originating from a mobile terminal, a decision is made as to whether the traffic may bypass the core mobile network entirely or may be passed into the core mobile network. The location at which the traffic is routed towards the internet 8 is preferably immediately after the Offload/Return decision (e.g. at the PoC); however, it may alternatively be routed out from the core network towards the internet 8 at a different component.

In the LTE/SAE network, the core network includes the MME 28, SGW 29 and PGW 30.

Typically, the signalling (control plane) for the connection will continue through the normal route but the user data traffic will be held at the eNodeB, this is possible by virtue of the separate user and control planes, as shown in FIG. 2.

The decision as to whether or not to use the Core mobile Network to route the data traffic can be based on various aspects.

Additionally a WLAN access point (AP) 11 may be provided to enable the mobile terminal 10 (with WLAN communication capability) to access the internet 8 independently of the mobile telecommunications network 12 by a direct radio connection with the AP11 (rather than via an eNodeB). The AP and WLAN communications may be in accordance with a relevant Standard, such as IEEE 802.11.

The arrangement of FIG. 2 is in relation to a LTE/SAE network. The invention is equally applicable to 3G networks. In this regard, FIGS. 3 and 4 show examples of possible network architectures for implementing the offload decision module in 3G macro networks and 3G Femto networks respectively.

Figure 3:
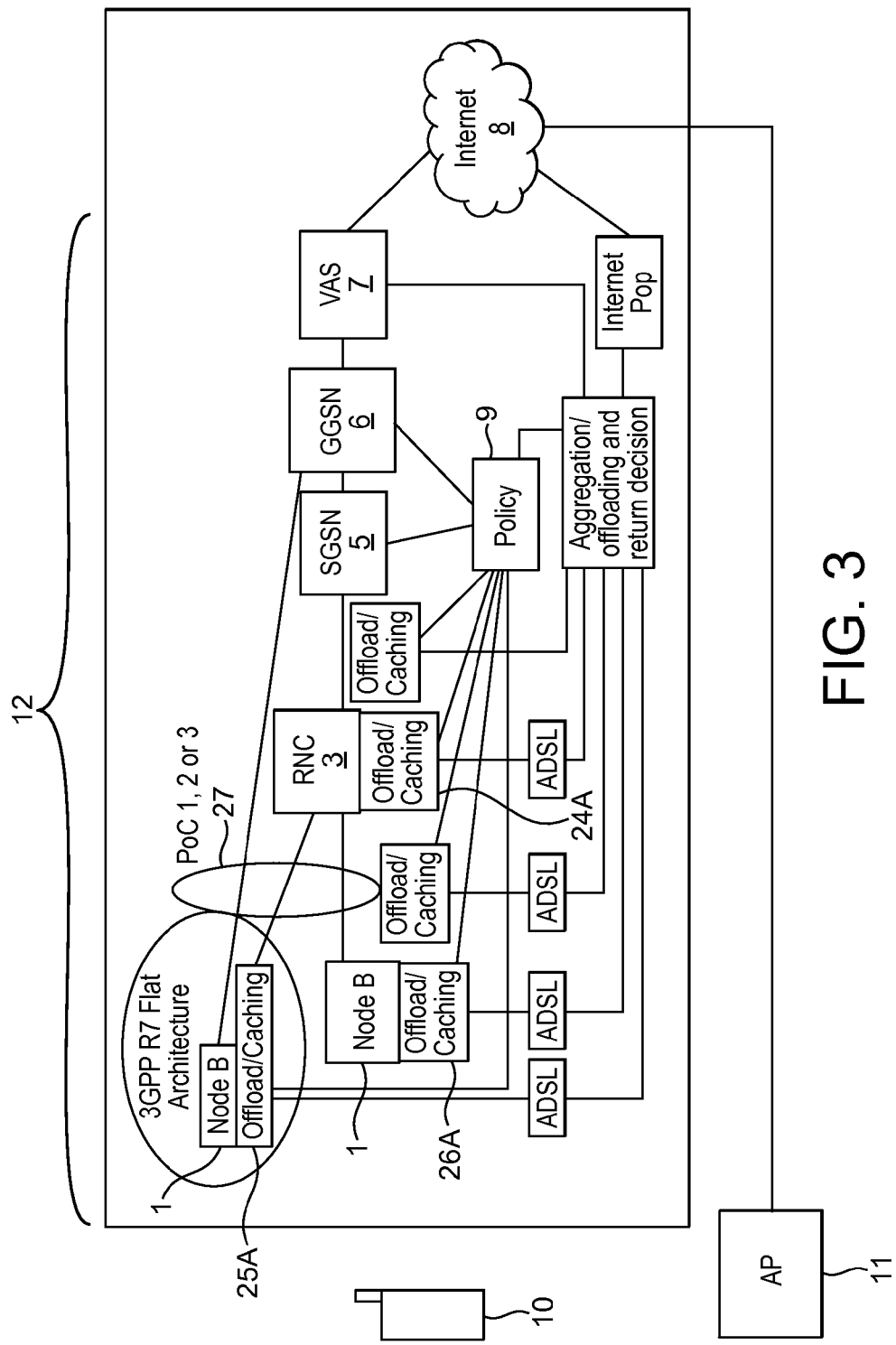
FIG. 3 illustrates a packet data network architecture, implemented in a 3G UMTS network.
Figure 4:
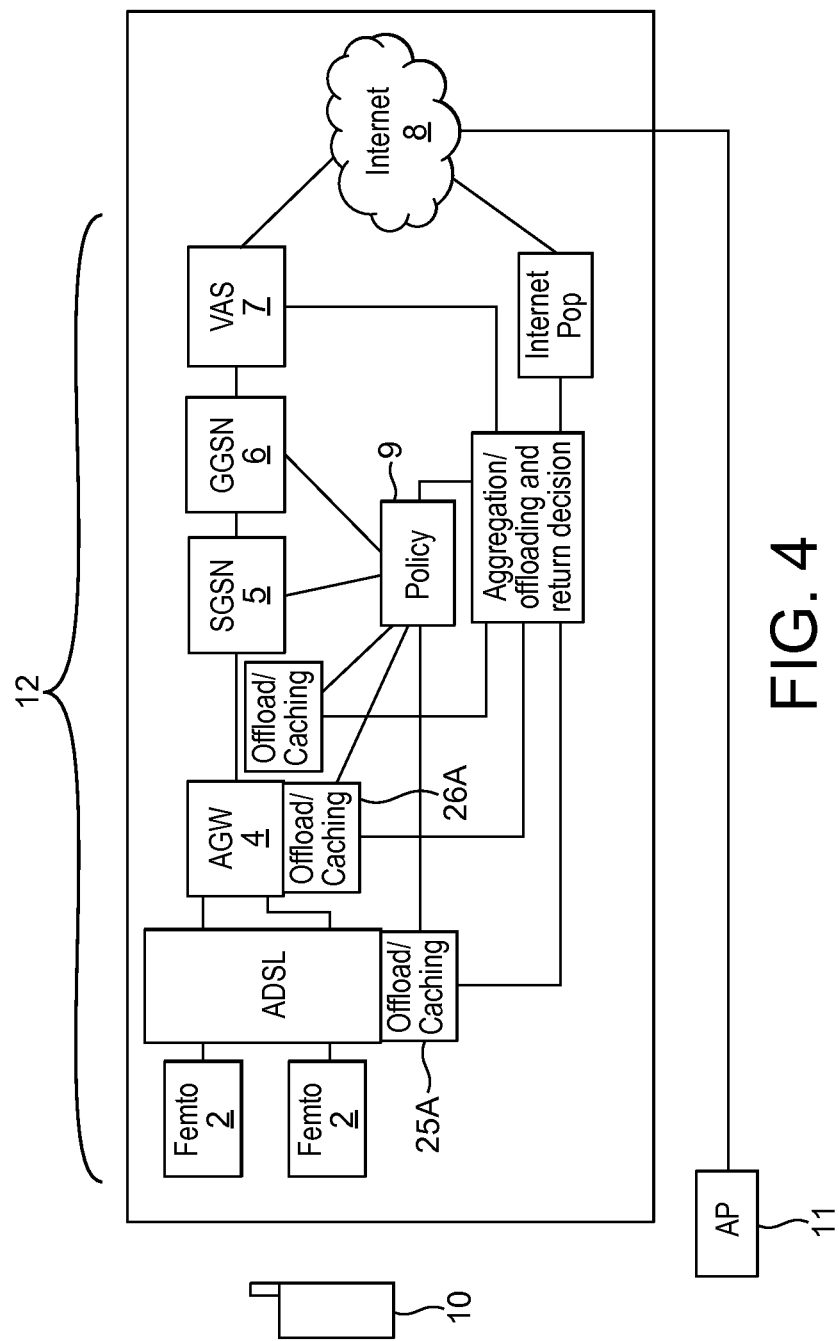
FIG. 4 illustrates a packet data network architecture, implemented in a 3G network utilising femto cells.

The offload decision modules would operate in the same manner as described in relation to the LTE/SAE network; however, as shown in FIGS. 3 and 4 the offload/return decision block may be located at many different locations in the network.

In this regard, from FIG. 3 in particular it can be seen that the exact placement of the decision module/gateway can be varied, and that, for a macro 3G network, it can be placed at or between the Node Bs 1 and the RNCs 3, and also between the RNCs 3 and the SGSNs 5 (or any combination thereof). It would also be possible to place the module/gateway at the GGSN 6 (although not the SGSN 5, in this embodiment, as this does not control user data, only control data).

In the Legacy 3G Macro network 12 (FIG. 3), a percentage of the macro network traffic may be offloaded from the core and transport (IuPS, Gn, etc) by diverting specific traffic for certain user(s) directly to the Internet 8.

The offload/return decision block 25A, 26A manages the decision on how to route the data.

Where the decision block 25A, 26A is located in the Node Bs 1 (or on the Iub interface), it becomes possible to redirect the data from all the remaining mobile network elements (e.g. the RNC 3, SGSN 5, GGSN 6 and VAS 7 for macro 3G), and sending the data directly to the Internet 8. In a similar manner, where the decision block 24A is located at the RNC 3 (or on the Iu interface), it becomes possible to redirect the data from the SGSN 5, GGSN 6 and the VAS 7. The alternative data route is preferably a DSL using ADSL.

It is also preferable to aggregate the alternative data routes for each cell, where applicable. In this regard, each cell will have at least one RNC 3 and a plurality of Node Bs 1, so where the decision blocks 24A, 25A, 26A are situated at or in the vicinity of the Node Bs 1, for instance, there will be a plurality of links which should ideally be aggregated before being passed to the Internet 8. At the point of this aggregation, there is preferably a further decision block which enables data to be returned to the legacy route. For instance, a new policy rule may have been implemented, which requires or enables previously offloaded data to be returned to the core network route. This new policy rule may be communicated to the return decision module by the core network policy module 9. In FIGS. 3 and 4, this returning of data is only shown to the VAS 7, but the data may be returned to one or more of the other core network elements (SGSN 5, GGSN 6, VAS 7 and policy module 9).

Additionally a WLAN access point (AP) 11 may be provided to enable the mobile terminal 10 (with WLAN communication capability) to access the internet 8 independently of the mobile telecommunications network 12 by a direct radio connection with the AP11 (rather than via a NodeB). The AP11 and WLAN communications may be in accordance with a relevant Standard, such as IEEE 802.11.

Figure 5:
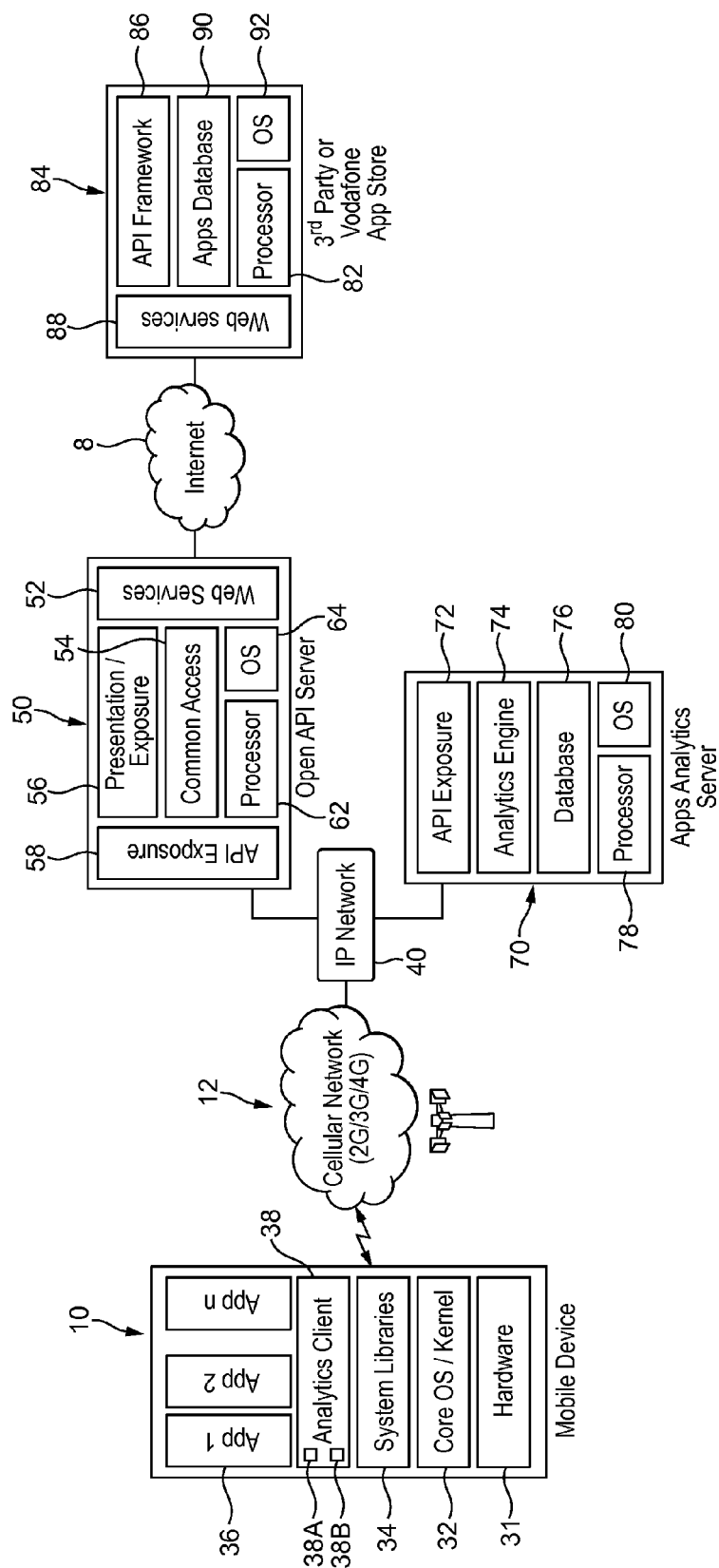
FIG. 5 illustrates elements of a mobile telecommunications system for implementing application monitoring and analysis in accordance with an embodiment of the invention.

According to an embodiment of the invention, the mobile device 10 (which may be registered with a mobile/cellular telecommunications network as shown in FIG. 1, 2, 3 or 4) may have installed thereon a plurality of applications. FIG. 5 shows in more detail the elements of the mobile terminal 10 and additional elements for making applications available, and for gathering and analysing performance data relating to the applications, in accordance with an embodiment of the invention.

These elements include a source of applications 84, such as an "app store", which may be managed by the mobile telecommunications network operator or a third party. Examples of conventional source of applications are Android Market and The Apple App Store. Application developers may also connect to the source of applications 84 to obtain analytics data (to be described) relating to applications.

The source of applications 84 may comprise Application Programming Interface (API) framework 86 which provides an interface between a web services element 88 and an application database 90. The API framework 86 presents a novel standardised interface. The novel standardised API provides a consistent interface, defining communication protocols, ports etc. Full details of the API may be published to allow easy communication with the API framework 86. The applications database 90 may store the applications or may include details of the storage location from where an application can be retrieved. Processing power of the source of applications 84 is provided by processor 82 on which an appropriate operating system 92 runs.

The mobile device 10 may, in the conventional manner, include hardware 31, such as microprocessors and memory, which provides the necessary resources to allow a core operating system/kernel 32 to function and which supports system libraries 34. A plurality of applications 36 (App 1, App 2, . . . , App n) may be installed on the mobile device 10.

The mobile terminal 10 is connected to mobile telecommunications network 12 (e.g. comprising elements designated with reference numerals 1, 2, 3, 4, 5, 6, 7 and 9 in FIGS. 1, 3 and 4 or comprising elements designated 9, 21, 22, 23, 27, 28, 29, 30, 31, 92 and 94 in FIG. 2). In order to allow an application 36 to be downloaded to the mobile terminal 10, the application store 84 is coupled to the mobile device 10 via the mobile telecommunications network 12, and IP network 40 and an open API server 50. The open API server 50 communicates with the source of applications 14 via the Internet 8, these Internet communications being supported by the web services element 88 of the source of applications 84 and a corresponding web services element 52 of the open API server 50. The open API server 50 further comprises a common access part 54, a presentation/exposure part 56 and an API exposure part 58. The API exposure part 58 presents a novel standardised interface. The novel standardised API provides a consistent interface, defining communication protocols, ports etc. Full details of the API may be published to allow easy communication with the API exposure part 58. The functionality of these parts of the open API server 50 is supported by a processor 60 on which an operating system 62 runs.

The open API server 50 provides a standardised, unified interface which exposes mobile telecommunication network and application APIs to third parties (such as application developers, via the source of applications 84)

The arrangement of the open API server 50 and the source of applications 84 allows the user of the mobile terminal 10 to view and select applications from the source of applications 84 (for example using the graphical user interface (GUI) of the mobile terminal) for download of an application from the source of applications 84 to the mobile terminal 10 and to install the application as one of the applications 36 of the mobile terminal 10. Applications may also be pre-installed on the mobile terminal 10 prior to sale of the terminal (or installed in any other way).

In accordance with an important feature of the present embodiment, an application Analytics Server 70 is provided. The application Analytics Server communicates with the open API server 50 and the mobile telecommunications network 12 via the IP network 40. The application Analytics Server 70 includes an API exposure part 72. The API exposure part 72 presents a novel standardised interface. The novel standardised API provides a consistent interface, defining communication protocols, ports etc. Full details of the API may be published to allow easy communication with the API exposure part 72. The API exposure part 72 allows communication with the open API Server 50 via the corresponding API exposure part 58 of the open API server 50. An application Analytics Engine 74 is provided on the application Analytic Server 70, as is a database 76. The elements 72, 74 and 76 are supported by the processor 78 which runs in appropriate operating system 80.

In accordance with another important aspect of this embodiment, the mobile device 10 is provided with an analytics client 38. The analytics client 38 includes monitoring means 38A which monitors the performance of each of the applications 36 and generates performance data for each of the applications 36. The performance data for each application are separately analysable (and for this purpose may include an indicator of the application to which it relates, and may include an indication of the device to which it relates). The analytics client 38 further includes analysing means 38B which analyses the performance data for each of the respective applications 36 and generates analytics data which identifies characteristics of the applications, which can, for example, be used to find problematic ones of the applications in dependence upon the analysis. The analytics data may include an indicator of the application to which it relates (and may include an indicator of the device to which it relates).

The analytics client 38 may, via the GUI of the mobile terminal 10 (not shown), alert the user of the mobile terminal 10 to any of the applications 36 that is determined to be problematic as a result of the analysis performed. For example, an application 36 may be consuming excessive battery power of the mobile device 10 or may be causing excessive signalling to/from the mobile telecommunications network 12. By alerting the user to such a problematic application 36, the analytics client 38 allows the user to stop and/or uninstall the problematic application. The analytics client 38 may also provide the user with recommendations for solving problems with applications—e.g. an instruction to uninstall or update an application.

If the user accepts the activity as legitimate, the relevant application gets a positive score and is marked "trusted". If the user rejects the activity, the application gets a negative score and is marked "black-listed". Monitoring mean communicate "trusted" and "black-listed" applications list with analysis mean in order to build a global view.

The analytics client 38 may provide, via the GUI, an indication of the power consumption (or other characteristics) of each of the applications 36. More detailed information may be provided, such as the battery life remaining if each of the applications 36 is enabled or disabled.

As an alternative to (or in addition to) alerting the user via the GUI of the mobile terminal of a problematic application 36, the analytics client 38 may automatically stop an application 36 that is deemed to be problematic (or take some other suitable action) for example when power consumption or data throughput exceeds a threshold. The analytics client 38 may provide recommendations to the user to solve or mitigate problems with a particular application based on its analytics of the performance data.

The performance data generated by the monitoring means 38A of the analytics client 38 may, for each of the applications 36, relate to the following key performance indicators (KPIs):
 Resource KPIs—
 Data use
 Battery use
 CPU use
 Memory use
 Privacy data use (such as location data, address book data and SIM information)
 Usage KPIs—
 Duration of active use
 Frequency of use
 Location (where the application is used)
 Time (when the application is used)
 The network by which the application transmits and receives data (such as 2G, 3G, LTE and WLAN/WiFi)
 The Smart Phone and operating system on which the application is stored The analytics client 38 may also generate application related statistics (for a given time period) such as—
 The number and identity of applications downloaded and the date/time of the downloading
 The number and identity of applications deleted and the dates and time of the deletion
 The number and identity of applications that have crashed and the date and time that this occurred In accordance with an important feature of the embodiment, the analytics client 38 may report the performance data and/or the result of the analysis performed thereby (the analytics data) to the application analytics server 70 via the mobile telecommunications network 12 and the IP network 40. Preferably, this data traffic is transmitted at no cost to the user of the mobile device 10 (and is not counted as part of their data allowance). Also, this data traffic may be transmitted at times when the demand for communication resources on the network is otherwise generally low—such as in the early hours of the morning or other network quiet periods.

The performance data and analytics data are received by the analytics engine 74 of the application analytics server 70. The analytics engine 74 also receives performance data and analytics data from analytics clients other mobile telecommunications devices (relating to the applications in those devices). In this way the analytics engine 74 receives performance data and analytics data from a plurality of mobile devices relating to a plurality of applications running on those devices.

With regard to the "data use" KPI the analytics client 38 and/or analytics engine 74 may distinguish between background data and foreground data. Foreground data is that which is requested and consumed by the user—e.g. movie clips or news stories selected by the user. Background data is data not directly requested or consumed by the user but rather is data caused to be transmitted by an application to allow that application to operate. An application which uses a large amount of background data inefficiently is generally undesirable to the device user and the network.

Performance and analytics data for an application from a plurality of devices (such as various device types—of different manufactures and/or running different operating systems) may be consolidated (which may be useful for the application developer).

The mobile terminals 10 connected to the cellular telecommunications network may be numerous different types, and operating on numerous different platforms and operating systems. The analytics engine 74 is able to collect performance data and analytics data relating to applications on this diverse group of devices. The analytics engine 74 may generate further analytics data from the performance data. The analytics data (whether further data generated by the analytics engine 74 or data received from the analytics client 38) relating to each application on each mobile device is stored in the database 76. The performance data, analytics data and analytics engine 74 are such that the analytics engine 74 can recognise performance data and analytics data relating to a particular application on a particular device, and also can group performance and analytics data relating to different instances (versions) of an application that may be installed on a plurality of different mobile terminals 10 of a plurality of users.

The performance and analytics data (in-service information) from the analytics engine 74 and database 76 is made available to the open API server 50 via the IP network 40 by means of the API exposure parts 58 and 72, the presentation/exposure part 56 and the common access part 54.

The open API server 50 provides a unified interface to allow third parties (such as the source of applications 84) to access the performance and analytics data of the analytics engine 74. In this way, the data relating to the performance and usage of the applications 36 may be made available to the developers of the applications through the source of applications 84. This facilitates improvement of the applications by the developers.

This data may also be provided to a prospective user of an application, before installation of the application (e.g. through the application store), so that the prospective user can make an informed decision whether to install the application.

The open API server 50 may also send the performance and/or analytics data of the analytics engine 74 to the mobile device 10. This data may relate to applications 36 installed on the mobile device 10 only or may relate to the applications in general (including instances of the applications installed on other devices). In this way, the data relating to the performance and usage of the applications from the analytics engine 74 may be made available to the mobile terminal 10 and the user thereof via the GUI of the mobile terminal.

Application developers may proactively request performance and/or analytics data by sending appropriate commands via the source of applications 84 to the open API server 50, which are then passed, via the IP network 40, to the application analytics server 70. Such commands may include, for example:

| API | DESCRIPTION |
| --- | --- |
| Get Location (APP) | Location where the Application is mostly used (city, home/outdoor) |
| Popular App (category) | Most popular App for a particular category e.g. weather |
| Get Time (APP) | Time when the App is mostly used (e.g. 10-11 pm) |
| Get APP Profile (User) | Apps interest profile for a particular user (e.g. Sports profile) |
| Popularity Rating (APP) | Operator ratings in terms of App popularity (e.g. 4/5) |
| Green Rating (APP) | Operator rating in terms of resource consumption |
| Get Network (APP) | Network on which the App is mostly used (e.g. Wi-Fi, 3G) |
| Max_Time (APP) | App which gets most airtime |
| Max_Data (APP) | App which generates maximum data |
| Get_Device (APP) | Device on which the App is mostly used (e.g. iphone 4) |

The analytics engine 74 is operable to receive and interpret these commands, and then retrieves appropriate data from the database 76 to provide the data requested by these commands. The requested data is then returned to the application developer via the IP network 40, the open API server 50, the Internet 8 and the source of applications 84.

The open API server 50 also provides a unified interface to allow the user of the mobile device 10 to access the performance and analytics data relating to the performance and usage of the applications 36 from the source of applications 84. As mentioned above, the arrangement of the open API server 50 and the source of applications 84 allows the user of the mobile terminal 10 to view and select applications from the source of applications 84 (for example using the graphical user interface (GUI) of the mobile terminal) for download of an application from the source of applications 84 to the mobile terminal 10 and to install the application as one of the applications 36 of the mobile terminal 10.

Advantageously, as part of the selection procedure, the source of applications provides to the user, via their mobile terminal's GUI, information relating to the performance of applications of interest (which is derived from the analytics engine 74). The mobile terminal user can then make an informed decision about whether to install a particular application. The user might be made aware that a particular application consumes a significant amount of data and/or rapidly depletes the terminal's battery.

Advantageously, the information relating to the performance of applications of interest may relate particularly to the type of mobile terminal of the user—e.g. the particular make/model or the operating system used.

The analytics client 38 of the mobile terminal 10, as well as providing data relating to problematic ones of the applications 36, also advantageously generates data indicating which of the applications 36 are in use at a particular time, which data is passed to the analytics engine 74. The analytics engine 74 may use this data in combination with other data available from the telecommunications network 12 and/or the mobile device 10. For example, the application analytics data may be used in combination with location data of the mobile terminal. This location data may be provided by the mobile terminal itself—provided, for example, by a GPS receiver of the mobile terminal. Alternatively, this location data may be provided by the mobile telecommunications network 12 and may be obtained, for example, by the technique of cell triangulation.

Information relating to the location of the mobile terminal 10 is monitored by the monitoring means and notified to the analysis means 74 to recommend which applications should be used (if already installed) or could be installed or used at a particular geographical location, such as a Formula 1 application at Silverstone or a speedy check-in application at an airport. The user may be provided with targeted context-aware in-application advertisements particular to the situation of the user at a given location and/or time. For example, if a user uses a mapping application at breakfast time, an advertisement for a breakfast special offer of a nearby restaurant may be sent by the analytics engine 74 for display within the mapping application.

The network uses quality of service (QoS) to manage traffic during high load situations and to support marketing propositions.

The analytics client 38 and/or analytics engine 74 may analyse application usage of a particular mobile device to determine the most popular application or applications 36 of a particular user. The mobile device and/or network may then be configured to offer the best QoS to communications to/from the mobile terminal which relate to that particular application. This may be a service offered to particular users, possibly in exchange for a fee. The monitoring and analytics aspects may keep an updated set of information about the most popular application for that particular user (as it may change over time).

For example, if a user's most popular application is Facebook, then data relating to Facebook may be given priority over other data transmissions of that mobile terminal. That is, other data transmissions may be delayed to reduce latency in Facebook data transmissions. In this way quality of service for Facebook transmissions can be improved for a given bandwidth. In an alternative arrangement the network 12 is instructed to make available additional bandwidth for the most popular application (Facebook in this example). Furthermore if the user is not connected through the mobile network, an application-level QoS session can be initiated (by-passing the core mobile network) over a wireless LAN link (for example) for popular applications. In one example, it may be detected that a particular user A has a popular application P which should always get higher QoS as compared to other applications used by the same user A. Whenever application P is initiated in the user A device, since the monitoring means (with the help of analytics client and engine) know that this is a popular application for the user, the monitoring means instructs a high QoS session to be initiated via the mobile core network. Popular application for each user may be different and popular applications may change for each user over time (adapting the user behaviour) thanks to analysing and monitoring means. Moreover, even if the user is not connected through the mobile network, an application-level QoS session can be enabled over-the-top of any other connectivity means for popular application P.

The analytics engine 74 may identify an application 36 on a particular mobile terminal 10 that is making excessive or inefficient use of the capacity of the mobile telecommunications network (or has some other predetermined characteristic), and may notify the PCRF/Policy Module a (FIGS. 1, 2, 3, 4) to use the alternative, offload path for the mobile terminal avoiding the core of the mobile telecommunications network, where the cost of providing communications is less. Performance and/or analytics data from the analytics client 38 may continue to be passed to the analytics server 70 by sending this via the core network and not the offload path. Alternatively, the performance and/or analytics data of the analytics client 38 may be stored until the offloading ends, and then transmitted to the analytics server 70 when user plane data is again transmitted via the core network.

The analytics engine 74 may cause data to be offloaded data to the alternative, offload path for any other reason (e.g. by instructing the PCRF to perform the offload). A list of applications which needs to be offloaded may change dynamically based on the performance of the applications assessed by monitoring and analysis means.

The analytics engine 74 and/or the analytics client 38 may also cause the mobile terminal to attach to the API1 in dependence upon certain criteria, thereby bypassing the telecommunications network 12 entirely.

When the mobile terminal 10 is connected to the WLAN network via the API1 (whether due to user selection or actions of the analytics engine 74 or analytics client 38), the application and/or performance data of the analytics client 38 may be stored until the mobile terminal again connects to the network 12, and may then be transmitted to the analytics server 70 when user plane data is again transmitted via the core network.

The analytics engine 74 may also expose customer apps analytics information to customer care systems through the open API server 50 in order to enhance the care system visibility. For example, if a customer downloaded a malicious application which is draining the mobile battery, when the customer calls the Vodafone call centre, the customer care executive having access to analytics data can suggest deleting a particular application, which the analytics data suggests to be the main cause of battery drainage. In-field mobile device testing and performance improvements may be performed, such as over the air (OTA) upgrades to address problems identified by the performance and/or analytics data, in cooperation with the manufacturers of the mobile telecommunications devices.

The analytics client 38 may make available to the analytics engine 74 the status of the battery of the mobile terminal 10 and the power consumption that a particular time, the rate of data transmission and other "in service" information. The analytics engine 74 is able to provide the application developer with feedback about usage of their applications, such as what time the application is used, the location of usage and the radio access network on which application is used (WLAN, 2G, 3G, 4G, etc.)

The embodiment may provide various advantages, such as those discussed below.

By monitoring the performance of applications, and thereby facilitating the improvement of or removal of problematic applications, a user's perception of the ability of the mobile telecommunications network to provide a high quality smart phone user experience will be improved.

The data relating to the performance of the applications enables only selected quality applications to be offered to users. In this way, a user will know that they can trust the applications offered are of appropriate quality. Alternatively, applications may be offered without restriction but an indication of the quality may be provided, in order to allow users to make an informed choice. In this way, if the user experiences a deterioration in performance of their smartphone, they are more likely to attribute it to their selection of a poor quality application, rather than a network or smartphone quality issue.

The mobile telecommunications network is provided with more visibility of customers, and can offer improved QoS, selective offload from the cellular network to an alternative, offload path or a WLAN network or customer promotions.

The mobile telecommunications network may make available the application based analytics data to third parties, such as application developers and others, as a product (for example, in exchange for a payment).

High quality application developers may be attracted to make available applications that provide good performance for the mobile telecommunications network and/or a particular device and to make these available on the source of applications 84 as the developers know that the quality of the applications will be recognised and the likelihood of these applications being purchased by users of the network will be increased.

The number of devices returned as being faulty will be reduced.

Enterprise customers often need strong technical capability to understand the data usage of their employees. Access to the analytics engine 74 could be extended to the enterprise customers' telecom management systems through open API platform 50 to allow greater visibility. For example, the enterprise customers use this to see if their employees are using Facebook or YouTube on their mobile and how much data these applications are consuming, which helps them to improve the mobile usage company policies for increased productivity and/or reduce spend.

Mobile telecommunications network users will be empowered and awareness and visibility of application quality.

In the embodiment shown in FIG. 5 analysing means is provided at the mobile device 10 by the analytics client 38 and at the analytic server 70 by the analytics engine 74. It should be understood that analysis means may be provided at only one of the mobile device 10 and the analysis server 70.

The invention claimed is:

1. An apparatus comprising:
    a telecommunications device comprising a processor component and a monitoring component, the processor component being configured to run a plurality of applications and the monitoring component being configured to monitor the plurality of applications and generate performance data; and
    an analysing component configured to analyse the performance data and to identify characteristics of the plurality of applications, wherein the analysing component is configured to cause communications destined for a data network to use an alternative data route between the device and the data network, and wherein the monitoring component is configured to monitor the plurality of applications when communications are transmitted via the alternative data route.

2. The apparatus of claim 1, wherein the characteristics identified by the analysing component indicate at least one problematic application.

3. The apparatus of claim 2, including alerting means for alerting a user of the device to the at least one problematic application.

4. The apparatus of claim 2, wherein the analysing component is configured to take action to mitigate the effect of the at least one problematic application.

5. The apparatus of claim 2, wherein the analysing component is configured to stop the at least one problematic application.

6. The apparatus of claim 1, wherein the analysing component comprises part of the telecommunications device.

7. The apparatus of claim 1, wherein the analysing component is coupleable to the telecommunications device via a wireless link.

8. The apparatus of claim 7, wherein the analysing component is configured to receive performance data from a plurality of sources and to analyse the performance data to identify characteristics of applications associated with each of those sources.

9. The apparatus of claim 8, wherein the analysing component is configured to generate analytics data relating to different instances or versions of corresponding applications running on a plurality of devices and/or associated with a plurality of sources.

10. The apparatus of claim 7, wherein the telecommunications device includes an interface component configured to present performance data from the analysing component relating to an application of interest to the user of the device to enable the user of the device to make an informed decision as to whether to install the application of interest.

11. The apparatus of claim 7, further configured to make the performance data available to application developers.

12. The apparatus of claim 1, further comprising a component for varying a quality of service provided for communications relating to at least one of the plurality of applications.

13. The apparatus of claim 12, wherein the component for varying the quality of service is configured to vary the quality of service based the performance data, analytics data and/or the analysis of the performance data.

14. The apparatus of claim 1, wherein the analysis component comprises an analytics server and wherein the analysis component is configured to send the performance data and/or analytics data from the telecommunications device to the analytics server via a different route than the alternative data route when the alternative data route is in use for user data.

15. The apparatus of claim 1, wherein the analysis component is configured to store the performance data at the telecommunications device while user data is being transmitted using the alternative data route and transmit stored performance data to an analytics server when user data is transmitted via a different route than the alternative data route.

16. A method comprising:
    running a plurality of applications via a processor component;
    monitoring the plurality of applications and generating performance data via a monitoring component;
    analysing the performance data and identifying characteristics of the plurality of applications via an analysing component;
    causing communications destined for a data network to use an alternative data route between the device and the data network via the analysing component; and
    monitoring, via the monitoring component, the plurality of applications when communications are transmitted via the alternative data route.

17. The method of claim 16, wherein the characteristics of the plurality of applications indicate at least one problematic application.

18. The method of claim 17, further comprising alerting a user of the at least one problematic application.

19. The method of claim 17, wherein analysing the performance data includes mitigating the affect of the at least one problematic application.

20. The method of claim 17, wherein analysing the performance data includes stopping the at least one problematic application.

21. The method of claim 16, wherein analysing the performance data is performed via a telecommunications device.

22. The method of claim 16, wherein analysing the performance data is performed via an entity coupleable to a telecommunications device via a wireless link.

23. The method of claim 22, wherein analysing the performance data includes receiving performance data from a plurality of sources and analysing the performance data to identify characteristics of the plurality of applications associated with each of the plurality of sources.

24. The method of claim 23, wherein analysing the performance data includes generating analytics data based on different instances or versions of the plurality of applications running on a plurality of devices and/or associated with a plurality of sources.

25. The method of claim 22, further comprising presenting performance data relating to an application of interest to a user of the telecommunications device to enable the user of the telecommunications device to make an informed decision as to whether to install the application of interest.

26. The method of claim 22, further comprising making the performance data available to application developers.

27. The method of claim 16, further comprising varying a quality of service of communications relating to at least one of the plurality of applications.

28. The method of claim 27, wherein varying the quality of service is based on the performance data, analytics data and/or the analysed performance data.

29. The method of claim 16, further comprising sending the performance data and/or analytics data from a telecommunications device to an analytics server via a different route than the alternative data route when the alternative data route is being used for user data.

30. The method of claim 16, further comprising storing the performance data at a telecommunications device while user data is being transmitted using the alternative data route and transmitting stored performance data to an analytics server when user data is transmitted via a different route than the alternative data route.

* * * * *